United States Patent [19]

Kobayashi et al.

[11] Patent Number: 4,579,707
[45] Date of Patent: Apr. 1, 1986

[54] METHOD FOR PRODUCING A THIN-WALLED CERAMIC TUBE

[75] Inventors: Kazuo Kobayashi, Nagoya; Mamoru Furuta, Toyoake; Yoshio Maeno, Nagoya, all of Japan

[73] Assignee: NGK Insulators, Ltd., Japan

[21] Appl. No.: 508,196

[22] Filed: Jun. 27, 1983

[30] Foreign Application Priority Data

Jun. 29, 1982 [JP] Japan .................................. 57-110737

[51] Int. Cl.⁴ .............................................. C04B 35/64
[52] U.S. Cl. ...................................... 264/209.1; 264/63
[58] Field of Search ............................... 264/63, 209.1

[56] References Cited

U.S. PATENT DOCUMENTS

| | | | |
|---|---|---|---|
| 4,169,875 | 10/1979 | Laska et al. | 264/63 |
| 4,181,487 | 1/1980 | Kessler | 425/326.1 |
| 4,293,514 | 10/1981 | Wada | 264/63 |
| 4,353,854 | 10/1982 | Oyamada et al. | 264/63 |
| 4,364,783 | 12/1982 | Theodore et al. | 264/63 |
| 4,387,067 | 6/1983 | Kobayashi et al. | 264/63 |
| 4,451,418 | 5/1984 | Furuta et al. | 264/63 |

*Primary Examiner*—James Derrington
*Attorney, Agent, or Firm*—Parkhurst & Oliff

[57] ABSTRACT

A thin-walled ceramic tube having a high light transmission and high dimens precision, which has been can be used as an envelope for a high pressure lamp, is produced by an extruding process in which a stiff plastic body for extruding is prepared, said body is extruded and the extruded tube is fired, said process being characterized in that the stiff plastic body consists essentially of ceramic raw material, a thermosetting organic substance and water and the extruded tube is hardened by heating immediately after extruded and pressured air is flawed into an inside portion of the extruded tube.

11 Claims, 1 Drawing Figure

METHOD FOR PRODUCING A THIN-WALLED CERAMIC TUBE

BACKGROUND OF THE INVENTION

1. Field of the Invention

The present invention relates to a method for producing a ceramic tube and more particularly, to a method for producing a thin-walled ceramic tube having excellent dimensional precision.

2. Description of the Prior Art

Forming methods for ceramic articles are generally classified into pressing, casting and extruding and the best one of those methods is selected depending upon the shape of the articles and the required properties of the articles.

The forming of tube-shaped articles is generally accomplished by extruding. However, when it is required that the tube shaped articles have a thin wall and high dimension precisional isostatic pressing is utilized. Further, the isostatic pressing is typically combined with a mechancial finishing operation to reduce the thickness of the walls of the article.

As a typical example of an article in which the thin wall thickness and high dimensional precision are required, there is a translucent alumina tube for a high pressure sodium lamp which can be used as a light source. This translucent alumina tube is used as an envelope of a lamp, so that the light transmission of the tube is important. Hence, the wall of the tube must be thin. Furthermore, in order to maintain the gas-tightness of a sealed portion between metal electrodes and the tube and constantly maintain the lamp properties (lamp electric voltage, lamp output, stability of color tone), high dimensional precision is required.

For example, as the dimension specification of an envelope for a high pressure sodium lamp of 400 W, the following factors are required.

Outer diameter $\phi 9.5 \pm 0.1$ mm
Length $113 \pm 1$ mm
Wall thickness $0.85 \pm 0.1$ mm
Straightness less than 0.05 mm per 100 mm When a general extruding technique is used to produce a tube-shaped article, for which such a dimension specification is necessary, the shaped body readily plastically deforms immediately after the extruding thereof and strain results in the axial direction of the tube. Hence, it has been difficult to obtain shaped articles having the above dimension specifications. Thus, the translucent alumina tube has been produced as follows. A tube having a somewhat larger thickness than the dimension specification is formed by isostatic pressing. The thus formed body is subjected to a working for abrading the outer surface to finish the body into the given thickness and outer diameter size and then the shaped body is fired. But, in this method, some type of subsequent machining is needed after the the body is isostatically pressed. Hence, the number of processing steps increases and further reusing the raw material powder abraded by the working of the outer circumference is difficult because of an admixture of impurities and the expensive alumina powder having a high purity is wastefully lost. Therefore, this process is uneconomic. Furthermore, in the pressing method, the shaped bodies are singly formed under a high pressure press, so that the productivity is poor and the rubber mold for the shaping to be used and the component (valves) of the isostatic press machine to which a high pressure is subjected, wear out rapidly resulting in this process also being uneconomical.

SUMMARY OF THE INVENTION

The present invention aims to obviate the above described drawbacks and is to provide a method for economically producing a thin-walled ceramic tube by an extrusion process which has been heretofore considered to be difficult.

Thus, the present invention lies in a method for producing a ceramic tube having a thin wall and a high dimensional precision in which a stiff plastic (i.e. plastically deformable body) for an extruder is prepared. The plastically deformable material is extruded to obtain a shaped tube and then the shaped tube is fired. More specifically a stiff plastic body is prepared to consist essentially of a ceramic raw material powder, a thermosetting organic substance and water, the prepared raw batch is formed into a desired shape by extruding and the shaped tube is hardened by heating it immediately after extruding thereof to prevent plastic deformation.

DESCRIPTION OF THE PREFERRED EMBODIMENTS

Figure 1:
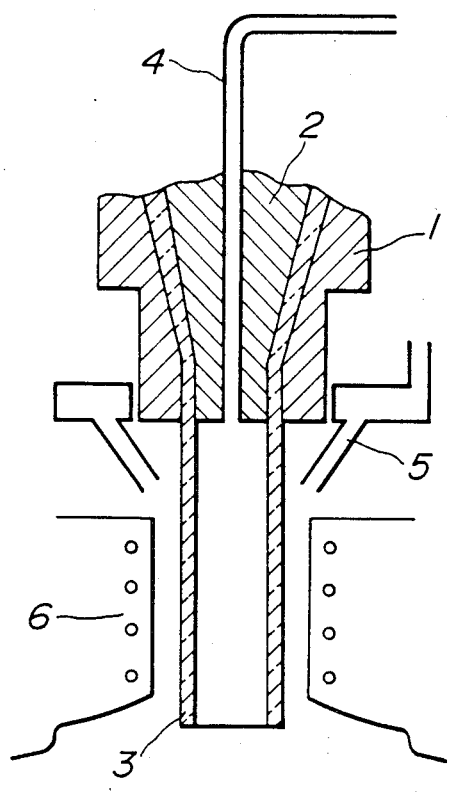
FIG. 1 is a diagrammatic explanatory sectional view of an apparatus for carrying out the method of the present invention.

A detailed explanation will be made with respect to the method for producing a translucent alumina ceramic tube of the present invention.

A mixture of alumina fine powder, which ultimately forms the translucent alumina ceramic through a final firing, thereof a sintering aid, a hydrophilic organic substance which is thermosetting and can be decomposed or volatilized by pre-firing, and water, in an amount of 12–25% by weight, are subjected to a thorough mixing operation. The selection of the organic substance is important for carrying out the present invention and it is necessary that the organic substance be soluble in water and can be cured (gelated) by heating and thermally decomposed, such that no residue remains after firing of the mixture. Various organic substances having these properties can be used and said substances are not particularly limited, but the commercially available organic substances are the methyl cellulose series of organic substances. An amount of the organic substance which is added is preferred to be 2–6% by weight, but the precise amount to be added is influenced by the properties of the alumina raw material powder. The reason why water and a hydrophilic organic substance are added to the ceramic raw material is based on the fact that these substances are inexpensive and are highly affinitive to the ceramic raw material.

The admixture is subjected to a vacuum kneading operation to remove bubbles from the raw batch material and to form a cylindrical stiff plastic body having a suitable size for the extruding process. The cylindrical body is extruded into a thin-walled tube by using a pusher type or auger type extruder. The extruded tube is immediately exposed to heated ambient such that the contained organic substance is rapidly thermoset, whereby the extruded tube is hardened to prevent various type of deformation thereof such as, squat, bow and the like and further, water is removed. The heating means for attaining such a purpose depends upon the type of the extruder used. It is commercially preferable to continuously pass the extruded tube through a heating furnace arranged near and end of an extruding die 1 and 2, as shown in FIG. 1. In this case, the ambient temperature is preferred to be 300–800° C. This is because at a temperature of lower than 300° C., the extruded raw tube is plastically deformed due to its own weight before thermosetting of the organic substance proceeds. While, when the ambient temperature is higher than 800° C., thermosetting of the organic substance is promoted, but water in the extruded raw tube results in an undesirable evaporation phenomenon owing to the sudden heating and bubbles are likely to remain in the produced article. Further, a portion of the organic substance is carbonized and it is difficult to remove such carbonized substance through subsequent firing. Hence, the temperature should not exceed 800° C.

Furthermore, in order to prevent deformation of the extruded body due to shrinking towards the inner diameter side of the extruded tube and to remove water vapor generated owing to the heating of the extruded tube, it is effective to provide an air supplying hole 4 in an inner die 2, by which the inner side of the extruded tube is formed, and introducing air therethrough at a pressure of 0.2–1.0 kg/cm$^2$, such that it is acts upon the inside of the raw tube.

This limitation of the air pressure is based on the following reason. When the pressure is lower than 0.2 kg/cm$^2$, the removal of water vapor become insufficient and over saturation results in water drops forming on the inner wall of the extruded tube. Such water softens and deforms the tube, or roughens the inner surface of the tube, thereby deteriorating the light transmission of final product. When the pressure is higher than 1.0 kg/cm$^2$, the extruded tube is deformed or ruptured.

The thus formed tube has an enough strength to maintain the shape conforming to the extrusion die and does not deform due to handling. Then, such a tube is cut into an appropriate length and gradually heated in a heating furnace at 800–1,200° C. to remove the remaining water and the organic substance. After this intermediate heating, the thus treated tube is heated up to a high temperature of 1,700°–1,900° C. in a hydrogen furnace, vacuum furnace and the like to obtain a translucent alumina ceramic.

Through the above described extruding treatment, a thin-walled translucent alumina ceramic tube having a high dimensional precision can be obtained.

The following examples are given for the purpose of illustration of this invention and are not intended as limitations thereof.

| Example 1 | |
|---|---|
| Alumina fine powder having a high purity (99.99%) | 3,000 g |
| Magnesium oxide | 3 g |
| Methyl cellulose | 90 g |
| Polyethylene oxide | 30 g |
| Water | 600 g |

These substances were charged in a kneader and stirred for about 30 minutes and thoroughly mixed and then kneaded by an auger type of vacuum kneader to prepare a cylindrical stiff plastic body having an outer diameter of 50 mm and a length of 250 mm. This cylindrical body was extruded through a die provided at the top of a pusher type extruder at a rate of 15 mm/sec into a tube having an outer diameter of 12.35 mm and an inner diameter of 10.14 mm. The extruded tube was immediately passed through an electric furnace provided just below the extruding die to thermoset the extruded tube as shown in FIG. 1.

In this case, the influence of the thermosetting conditions on the extruded tubes was determined by changing the temperature range of an electrical furnace 6 from 200° C. to 1,000° C. under a constant air pressure.

Further, the effect of air pressure on the hardening of extruded tubes was determined by supplying air in a pressure range of 0.0 to 1.2 kg/cm$^2$ from an air supplying hole 4 provided in an inner die 2, the inner die 2 forming the inner diameter of the extruded tube 3, the air being supplied by an air-blowing pipe 5 provided at the outer periphery of an outer die 1 at the end of the extruder, provided that the temperature of the furnace 6 adjacent to the inner and outer dies 1 and 2, respectively was set to be 600° C.

The hardened tube was cut into a length of about 150 mm and dried at 150° C. for 12 hours and then heated in an electric furnace to 900° C. to remove the organic substances. Then, the thus treated tube was fired at 1,850° C. for about 6 hours by passing it through a transverse pusher type of hydrogen atmospheric furnace to produce a translucent tube of (9.5–8.0)$\phi \times 115$ l. The properties of the produced articles are shown in Table 1 and Table 2.

TABLE 1

| Test No. | Thermo-setting temperature | Properties of the obtained tube | | |
|---|---|---|---|---|
| | | Roundness* | Bow | Light transmission |
| 1 | 200° C. | 0.2 | 1.0 | 92% |
| 2 | 300° C. | 0.08 | 0.5 | 94% |
| 3 | 400° C. | 0.08 | 0.4 | 93% |
| 4 | 600° C. | 0.06 | 0.3 | 95% |
| 5 | 800° C. | 0.06 | 0.3 | 90% |
| 6 | 1,000° C. | 0.06 | 0.3 | 74% |

*Max-Min of the outer diameter

TABLE 2

| Test No. | Air pressure | Roundness | Remarks |
|---|---|---|---|
| 1 | 0 | 0.3 | Inner surface: rough |
| 2 | 0.2 | 0.08 | |
| 3 | 0.4 | 0.08 | |
| 4 | 0.6 | 0.06 | |
| 5 | 0.8 | 0.06 | |
| 6 | 1.0 | 0.06 | |
| 7 | 1.2 | 0.1 | The tube was ruptured |

As shown from these tables, when the thermosetting temperature is 200° C., thermosetting of the organic substance is insufficient and deformation occurs in the subsequent treatments and the tube becomes oval and the bow is also large. While, at a temperatures between 300° C. and 800° C., both the roundness and the bow are within acceptable ranges and the tapes are capable of being satisfactorily practically used and the light transmission is excellent.

When the thermosetting temperature is 1,000° C., the dimensional precision can be satisfied but the blackening of the tube, which is presumably due to the residual carbonized organic substance, occurs and the light transmission is low. Furthermore, it has been confirmed that the air pressure introduced into the extruded tube can provide excellent results in a range of 0.2–1.0 kg/cm$^2$.

| Example 2 | |
| --- | --- |
| Alumina powder having purity of 99% | 5,000 g |
| SiO$_2$ powder | 100 g |
| MgO powder | 25 g |
| Methyl cellulose | 150 g |
| Water | 1,500 g |

In the same manner as described in Example 1, these substances were introduced into a kneader and kneaded for 30 minutes. This mixture was kneaded by a vacuum kneader to prepare a cylindrical stiff plastic body (outer diameter: 50 mm, length: 300 mm) to be used for the extruding. Then this body was subjected to a plunger type extruder to form a tube having an outer diameter of 10.0 mm and an inner diameter of 8.6 mm at a rate of about 30 mm/sec and the extruded tube was immediately passed through an electric furnace heated at 500° C. to thermoset the organic substance to obtain a tube capable of being manually handled. The tube was cut into a length of 800 mm and fired in a vertical type of gas furnace by raising the temperature to a maximum temperature of 1,680° C. and maintaining said temperature for about 1 hour to obtain a thin-walled alumina tube having an outer diameter of 8.3 mm and an inner diameter of 7.2 mm. The average roundness of this tube was 0.1 mm and the bow was 0.4 mm per 100 mm and excellent dimensional precision was obtained.

Examples of the present invention were explained with respect to a method for producing a thin-walled translucent alumina tube but the present invention is not limited to the translucent ceramic tube but is applicable to the production of ceramic tubes used for machine parts, optical parts, and thermal resistant and corrosion resistant parts.

As mentioned above, the present invention is a method for producing thin-walled ceramic tubes having high dimensional precision and excellent efficiency and highly contributes to the industry.

What is claimed is:

1. A method for producing a thin-walled ceramic tube comprising:
   mixing together a plurality of materials consisting essentially of a ceramic raw material, a thermosetting organic substance and water to form an extrusion batch;
   extruding said extrusion batch through an extrusion die to form an extruded tube; and
   hardening said extruded tube by heating said tube at a temperature of 300°–800° C. immediately after it has been extruded from said extrusion die.

2. The method as claimed in claim 1, wherein the thermosetting organic substance is methyl cellulose and it is added in an amount of 2–6% by weight, based on the ceramic raw material.

3. The method as claimed in claim 1, wherein the extruded tube is continuously passed through a heating furnace arranged adjacent said extrusion die.

4. The method as claimed in claim 1, wherein air having a pressure of 0.2–1.0 kg/cm$^2$ is supplied during the hardening of the extruded tube into an inside of said extruded tube from an air supplying hole provided in an inner die, which forms an inner wall of the extruded tube.

5. A method for producing a thin-walled ceramic tube comprising:
   mixing together a plurality of materials consisting essentially of a ceramic raw material, a thermosetting organic substance and water to form an extrusion batch;
   extruding said extrusion batch through an extrusion die to form an extruded tube; and
   hardening said extruded tube by heating the extruded tube at a temperature of 300°–800° C. with a heating furnace located adjacent said extrusion die, such that the extruded tube is heated immediately after it has been extruded from said extrusion die.

6. The method as claimed in claim 5, wherein the thermosetting organic substance is methyl cellulose and it is added in an amount of 2–6% by weight, based on the ceramic raw material.

7. The method as claimed in claim 5, wherein air having a pressure of 0.2–1.0 kg/cm$^2$ is supplied during the hardening of the extruded into an inside of said extruded tube from an air supplying hole provided in an inner die, which forms an inner wall of the extruded tube.

8. A method for producing a thin-walled ceramic tube comprising:
   mixing together a plurality of materials consisting essentially of a ceramic raw material, a thermosetting organic substance and water to form an extrusion batch;
   extruding said extrusion batch through an extrusion die to form an extruded tube;
   hardening said extruded tube by heating the extruded tube at a temperature of 300°–800° C. with a heating furnace located adjacent said extrusion die, such that the extruded tube is heated immediately after it has been extruded from said extrusion die; and
   supplying air having a pressure of 0.2–1.0 kg/cm$^2$ into an inside of said extruded tube from an air supplying hole provided in an inner die which forms an inner wall of the extruded tube.

9. The method as claimed in claim 8, wherein the thermosetting organic substance is methyl cellulose and it is added in an amount of 2–6% by weight, based on the ceramic raw material.

10. A method for producing a thin-walled ceramic tube comprising:
    mixing together a plurality of materials consisting essentially of a ceramic raw material, a thermosetting organic substance and water to form an extrusion batch;
    extruding said extrusion batch through an extrusion die to form an extruded tube, said extrusion die comprising a first portion which forms an outer surface of the extruded tube, a second portion which in conjunction with said first portion forms an inner surface of the extruded tube and said second portion having an air supplying hole therein;
    hardening said extruded tube by heating the extruded tube at a temperature of 300°–800° C. with a heating furnace located adjacent said extrusion die, such that the extruded tube is heated immediately after it has been extruded from said extrusion die; and
    supplying air from said air supplying hole during said heating of the extruded tube, in an amount between 0.2–1.0 kg/cm$^2$ onto said inner surface of the extruded tube.

11. The method as claimed in claim 10, wherein the thermosetting organic substance is methyl cellulose and it is added in an amount of 2–6% by weight, based on the ceramic raw material.

* * * * *